United States Patent
Barringer et al.

(10) Patent No.: US 6,816,390 B1
(45) Date of Patent: Nov. 9, 2004

(54) APPARATUS FOR BLIND SWAP CASSETTE GUIDANCE

(75) Inventors: Dennis R. Barringer, Wallkill, NY (US); Justin C. Rogers, Poughkeepsie, NY (US); Harold M. Toffler, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/701,577

(22) Filed: Nov. 5, 2003

(51) Int. Cl.⁷ .............................. H05K 7/14; H05K 7/18
(52) U.S. Cl. ...................... 361/801; 361/683; 361/686; 361/741; 361/747; 361/756; 361/759; 361/785; 361/788; 361/802
(58) Field of Search ................................ 361/683, 684, 361/686, 724–728, 730, 732, 736, 740, 741, 747, 748, 754, 756, 759, 785, 788, 796, 798, 801, 802, 807, 809

(56) References Cited

U.S. PATENT DOCUMENTS

| | | | |
|---|---|---|---|
| 5,579,204 A | * 11/1996 | Nelson et al. | 361/685 |
| 6,104,616 A | 8/2000 | Benson, Jr. et al. | 361/724 |
| 6,324,062 B1 | * 11/2001 | Treiber et al. | 361/727 |
| 6,419,517 B1 | * 7/2002 | Moden | 439/377 |
| 6,490,156 B2 | * 12/2002 | Chen | 361/686 |
| 6,549,400 B1 | 4/2003 | Medin et al. | 361/686 |
| 6,731,515 B2 | * 5/2004 | Rhoads | 361/796 |

* cited by examiner

Primary Examiner—Phuong T. Vu
(74) Attorney, Agent, or Firm—Floyd A. Gonzalez; Cantor Colburn LLP

(57) ABSTRACT

An apparatus for guiding a card enclosure into a daughter card enclosure includes a daughter card removeably positioned within a cage for connecting the daughter card with a mother card. A cassette assembly removably positioned with the daughter card enclosure for connection with said daughter card includes a card configured for pluggable signal interconnection with the daughter card. A guide means for guiding the cassette assembly into proper alignment with the daughter card is mountable therewith and an associated stiffener using two mounting locations. The guide means is configured to insure full insertion of said cassette assembly before plugging in the card and insure an unplugged status of the card before extraction of the cassette assembly from the daughter card enclosure.

22 Claims, 8 Drawing Sheets

APPARATUS FOR BLIND SWAP CASSETTE GUIDANCE

BACKGROUND OF THE INVENTION

Computers are customarily provided with sheet metal cage structures that contain a back plane. A back plane is a circuit board (e.g., mother card) or framework that supports other circuit boards, devices, and the interconnections among devices, and provides power and data signals to supported devices. The mother card is the main circuit card in the computer which connects to the back plane of the logic board. The computer cage structure is adapted to receive and removably support at least one and preferably a plurality of options or daughter cards (blades or nodes) which when operatively installed in their associated cage structure, upgrade the operating capabilities of the computer. For example, it is known to place an assembly, including a backplane and various circuit boards, such as a processor card, an input-output card and a so-called memory riser card, within an open cage. This forms a so-called central electronics complex (CEC) of a computer system. The cage is subsequently fixed within a computer housing.

A standard containing enclosure or cage protects the individual daughter cards and facilitates the easy insertion and removal of the daughter cards from a mother card (mother board) or back plane slot. These daughter cards may be installed in the computer during the original manufacture of the computer and or subsequently installed by the computer purchaser. The cage serves to position the circuit boards within the computer housing, and acts as an EMC (electromagnetic compatible) shield. An EMC shield allows operation in an electromagnetic environment at an optimal level of efficiency, and allows static charges to be drained to a frame ground. Moreover, the cage helps to protect the components contained therein from environmental damage, for example, vibrations, which could cause the components to fail.

Additionally, the cage is typically fixed within a so-called system chassis, which is a frame that provides further support for the cage, and which is removably stacked upon other system chassises within a system rack. The chassis may contain other components and sub-systems, such as power supplies and cooling fans, for example, which are connected to the components within the cage using cables, for instance.

A daughter card may include a relatively small rectangular printed circuit having a connecter along one side edge, a 24"×24" node weighing over a hundred pounds, or a server, for example. The mother card or system back plane slot has a socket connector. The daughter card connector plugs into a corresponding socket connector of the mother card to operatively couple the daughter card to the mother card or system back plane slot.

The daughter card is in turn engaged with a number of input-output cassettes housing a respective I/O card for connection within a daughter card enclosure. In such daughter card enclosures, the I/O card is mounted within a removable card enclosure or cassette. Each of these input-output cassettes must be blind swapped into the daughter card enclosure. This removable card enclosure allows for I/O card installation or removal from the daughter card enclosure when the card enclosure is installed or removed from the computer cage structure.

Given the extremely dense pitch and packaging of present I/O blind swap cassettes and the population of the daughter card into which the I/O card plugs, it has become necessary to develop a guidance system into the daughter card enclosure which minimizes both the mounting points to the mother card enclosure and the physical space such a solution may consume.

Thus, there is a need for an arrangement that will allow for blind swapping of an I/O card from a daughter card for servicing, for example, which does not require manually connecting and disconnecting various electrical connectors to provide signal interconnection therebetween while providing an easy and reliable means to align the I/O card to make such signal interconnections within the daughter card enclosure.

SUMMARY OF THE INVENTION

An apparatus for guiding a card enclosure into a daughter card enclosure includes a daughter card removably positioned within a cage for connecting the daughter card with a mother card. A cassette assembly removably positioned with the daughter card enclosure for connection with said daughter card includes a card configured for pluggable signal interconnection with the daughter card. A guide means for guiding the cassette assembly into proper alignment with the daughter card is mountable therewith and an associated stiffener using two mounting locations. The guide means is configured to insure full insertion of said cassette assembly before plugging in the card and insure an unplugged status of the card before extraction of the cassette assembly from the daughter card enclosure.

In another embodiment, a multiple card enclosure includes a mother card cage having a mother card enclosed therein; a daughter card removably positioned within the cage for connecting the daughter card with the mother card, the daughter card having a signal connector configured to connect to the mother card for signal interconnection therebetween; a cassette assembly removably positioned with a daughter card enclosure for connection with the daughter card, the cassette assembly having a card configured for pluggable signal interconnection with the daughter card; and a guide assembly configured to guide the cassette assembly into proper alignment with the daughter card for pluggable signal interconnection therewith, the guide assembly mountable to the daughter card and an associated stiffener using two mounting bosses extending from the guide assembly. The guide assembly is configured to insure full insertion of the cassette assembly before plugging in the card and insure unplugging of the card before extraction of the cassette assembly from the daughter card enclosure.

In yet another embodiment, a central electronics complex of a computer system includes a cage configured to be received in a rack; a backplane disposed in the cage, the backplane including a mother card having at least one card slot on a surface thereof; a plurality of daughter cards removably positioned within the cage, each daughter card having a signal connector configured to connect with a corresponding card slot in the mother card for signal interconnection therebetween; a cassette assembly removably positioned with a daughter card enclosure for connection with each daughter card, the cassette assembly having a card configured for pluggable signal interconnection with each daughter card; and a guide assembly configured to guide the cassette assembly into proper alignment with each daughter card for pluggable signal interconnection therewith, the guide assembly mountable to each daughter card and an associated stiffener using two mounting bosses extending from the guide assembly. The guide assembly is configured to insure full insertion of the cassette assembly before plugging in the card and insure unplugging of the card before extraction of the cassette assembly from the daughter card enclosure.

BRIEF DESCRIPTION OF THE DRAWINGS

Referring now to the exemplary drawings wherein like elements are numbered alike in the several FIGURES.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper", "lower", "front", "back", "over", "under", and similar such terms are not to be construed as limiting the invention to a particular orientation. Instead, these terms are used only on a relative basis.

Figure 1:
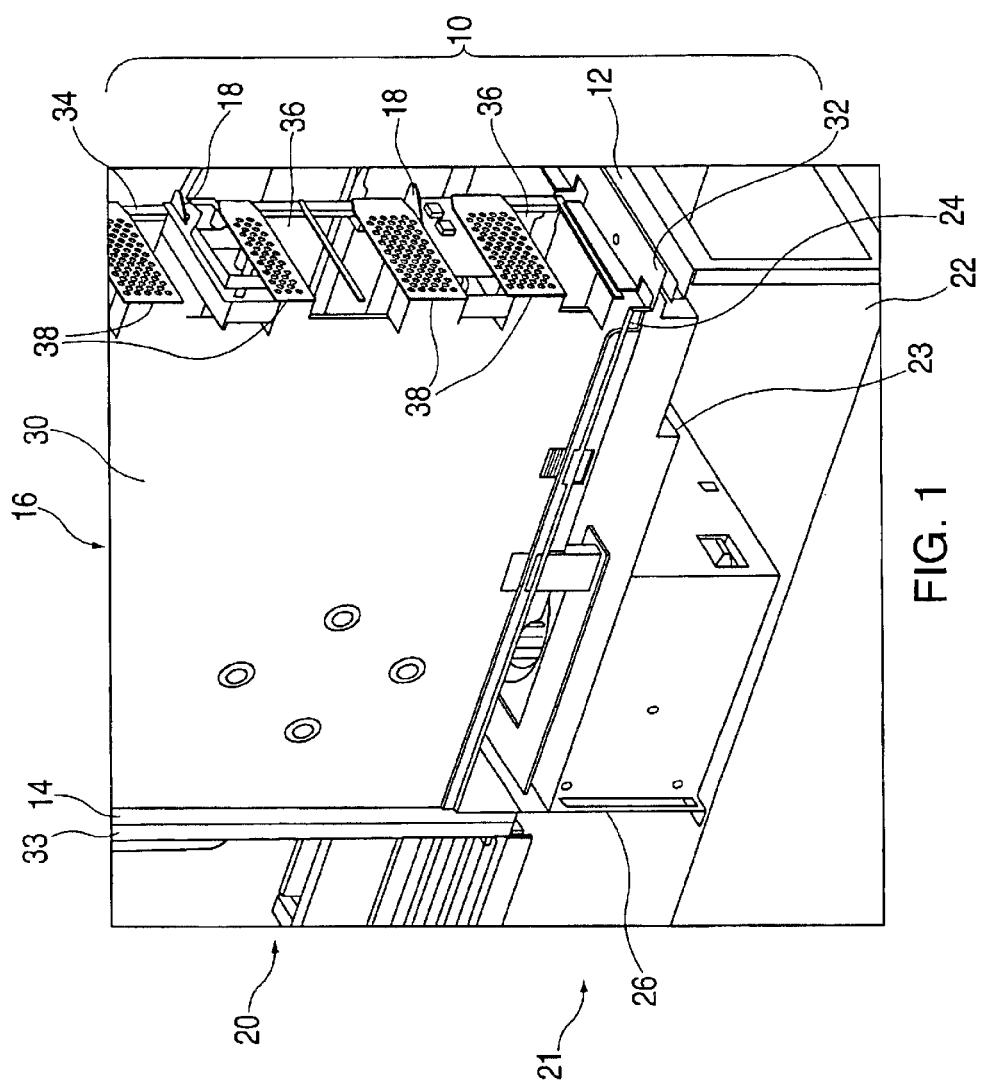
FIG. 1 is a perspective view of an multiple card enclosure illustrating one daughter card enclosure interfacing with a midplane for signal interconnection and two I/O cassettes interfacing the daughter card.
Figure 2:
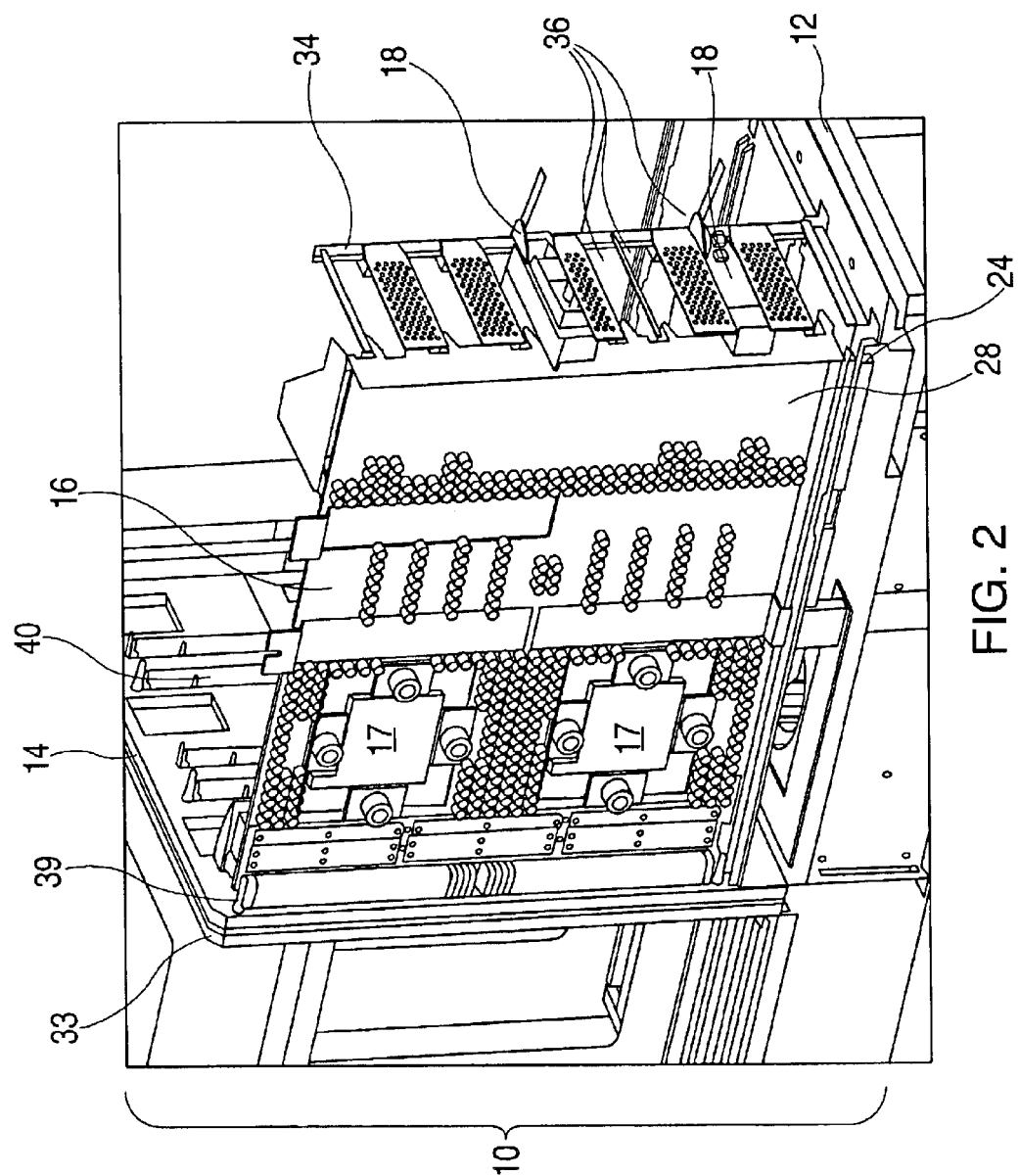
FIG. 2 is a perspective view of the exemplary daughter card enclosure of FIG. 1 with a stiffener removed therefrom.

FIGS. 1 and 2 illustrate a so-called central electronics complex 10 (CEC) of a computer system. The CEC 10 is comprised of an enclosure (such as a cage 12), a backplane or midplane 14 as illustrated, and a circuit board or daughter card, such as a blade or node 16 having two processor multi-chip modules 17, 256 GB memory on 16 cards (not shown), two input/output (I/O) cards 18, and a control multiplexer card (not shown), for example, attachable to the backplane 14.

As shown, the cage 12 has a box shape with a generally rectangular cross-sectional profile, and is formed of two cavities on one side of midplane 14, generally shown at 20 and 21, while three cavities are defined on an opposite side of midplane 14 with generally horizontal, spaced apart walls 22, 23, and 24 joined together by generally upright, midwall 26 extending from wall 24. Wall 22 defines a bottom floor defining cage 12. Wall 23 extends to midwall 26 defining a bus bar access area discussed more fully herein. Wall 24 defines a floor defining a cavity in which a plurality of daughter cards 16 may be disposed and interconnected with midplane 14. The walls 22, 23, and 24 define spaces within the cage 12, which contain air, power, and docking systems for a plurality of daughter cards 16 installed in the cage.

The cage 12 is dimensioned to accommodate the midplane 14 and a plurality of daughter cards 16, (up to four as shown). Moreover, the cage 12 is preferably comprised of sheet metal, which can be easily manipulated to form the walls 22, 23, 24, 26, although other materials, such as plastic, may also be used. However, it is preferable that the material used to form the cage 12 be conductive, so that the cage can serve as an EMC shield.

As best shown with reference to both FIG. 1 and FIG. 2, the backplane or midplane 14 is a generally planar, rectangular structure, and is accommodated within the cage 12 so that its major surfaces are substantially vertical and essentially perpendicular to the walls 22, 23, and 24 of the cage. Moreover, the daughter card 16 is comprised, for example, of a printed circuit board 28 (PCB) (FIG. 2), and a stiffener panel 30 (FIG. 1) disposed beneath (i.e., on one side of) the printed circuit board 28. An insulator panel, not shown, may also be provided between the stiffener panel 30 and the printed circuit board 28.

The stiffener panel 30 is connectable to the cage 12, for example, by fastening the stiffener panel to a flange 32 disposed on a lower bottom edge of walls 24. For example, the stiffener panel 30 can be screwed, bolted or welded to the flange 32. Other means for connecting the stiffener panel 30 to the cage 12 are within the scope of the present invention. When connected, the backplane 14 partially divides the cage 12 in two, and serves as a partial divider of the cage, with the printed circuit board 28 perpendicular thereto.

Preferably, an end distal from a backplane stiffener panel 33 has a tailstock 34 disposed thereon. As is known, a tailstock is a fixture or bezel that provides physical support for the associated electrical device (for example, I/O card 18), and which provides for a limited amount of electromagnetic radiation shielding and is configured to be reworkable.

The tailstock 34 is provided with a plurality of apertures 36, which form ports that allow various external peripherals to be connected to the backplane 14. For example, in the exemplary illustrated embodiment, the tailstock 34 is provided with eight such ports (FIG. 2). However, the number and size of the apertures 36 can be modified without departing from the spirit and scope of the present invention.

The tailstock 34 is preferably tailored to allow it to be fastened to stiffener 30 (shown in FIG. 1). For example, in the illustrated exemplary embodiment, the tailstock 34 is operably fastened to stiffener 30 via four apertures 38 in tailstock 34 aligned with corresponding threaded apertures configured in stiffener 30. When the daughter card 16 is received within cage 12, the portions of the tailstock 34 that extend to wall 24 can be fastened thereto. This secures the card 16 within the cage 12, and prevents fretting of any electrical connections between the backplane 14, and other system components disposed within the cage 12, for example. As is known, fretting is a phenomenon in which surface damage occurs when metal contacts are subjected to microvibrations.

Each daughter card 16 is generally planar, rectangular structures, with lengths that are substantially the same as their heights, as illustrated, but not limited thereto. As previously mentioned, the cage 12 can then be advantageously tailored in the same manner (with a length that is about the same as its height), so as to receive the respective cards 16 therein with a minimum amount of wasted space.

When installed in the cage 12, the cards 16 are essentially parallel to each other, and essentially perpendicular to the major surfaces of the backplane 14. However, other orientations may be possible, within the scope of the present invention.

The daughter card 16 is preferably removably coupled to the backplane 14 by inserting a known corresponding plug connector, such as a dual row of full edge length very high density metricinterconnector (VHDM) 39 (not shown in detail FIG. 2) on the respective card into an associated backplane card slot 40 (FIG. 2). However, other suitably configured plug connectors are contemplated and is not limited to VHDM 39. As will be appreciated, since the cage 12 is open at its front, each card 16 is inserted through the open front and moved in a horizontal vertical direction until the cards engage with the associated card slots 40 and power interconnects to be discussed more fully below.

As illustrated in FIGS. 1 and 2, the backplane 14 is adapted to receive and electrically interconnect a plurality of daughter cards 16. For example, the illustrated backplane 14 is adapted to receive four cards 16.

Further, and as illustrated best in FIG. 2, each daughter card 16 can accommodate a plurality of electrical components, for example, two MCMs 17, 256 GB memory on 16 cards (not shown), eight concurrently maintainable I/O hub cards (two shown installed) and a control multiplexer card (not shown).

Although the present embodiment has been described in connection with a daughter card 16 having a pair of MCMs 17, it is contemplated that the same inventive scheme can be utilized with other types of circuit boards. Moreover, it is also contemplated that the respective cards will be specifically tailored for use with the cage 12. For example, in the above-described exemplary embodiment, the plug connector of the daughter card is disposed symmetrically, that is, along a full length of the edge of the card.

Figure 3:
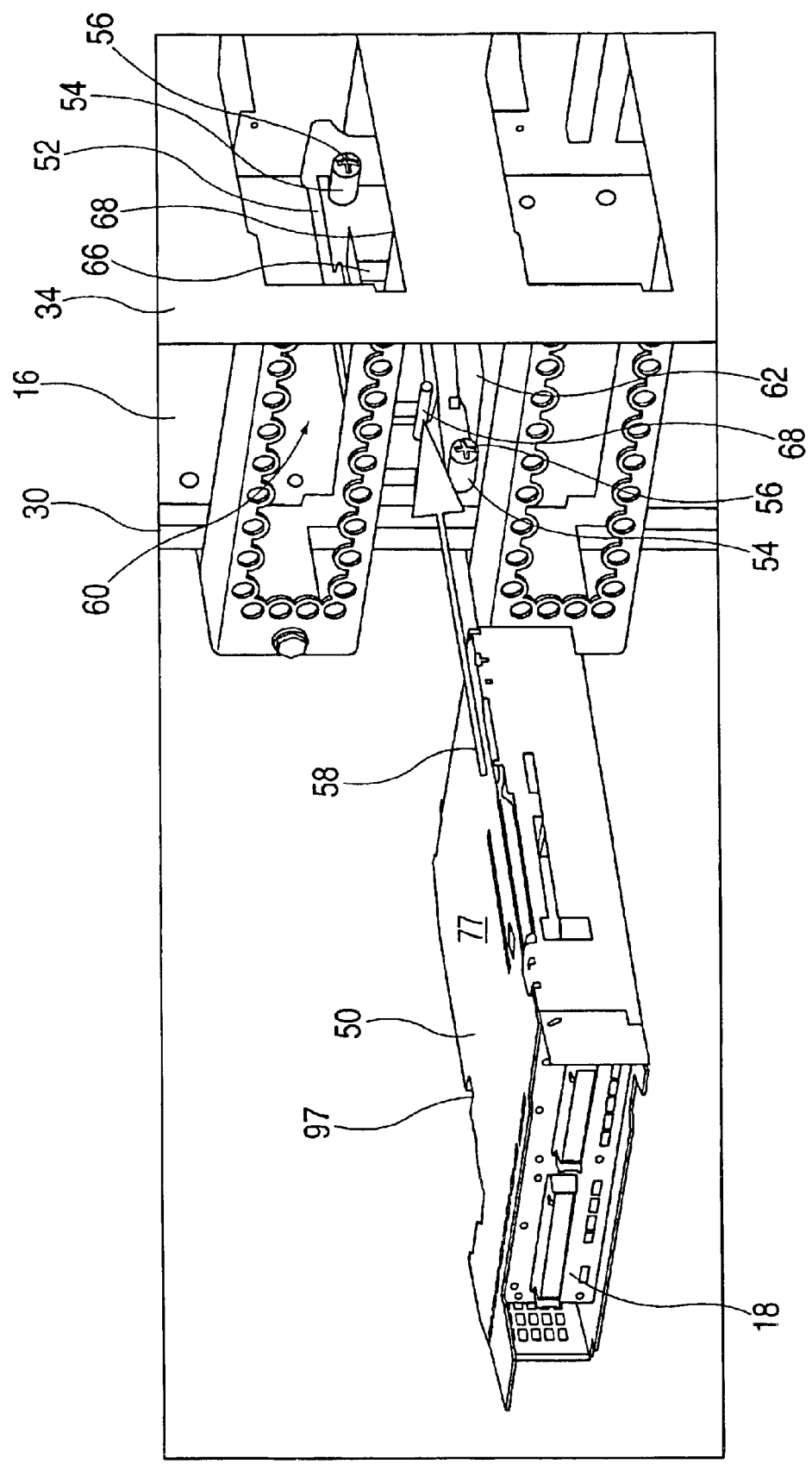
FIG. 3 is a reverse perspective view of FIGS. 1 and 2 illustrating an I/O cassette removed from an exemplary embodiment of a blind swap cassette guide mounted to a printed circuit board and stiffener of the daughter card configured to properly guide a corresponding I/O card in and out of the daughter card.

As best shown in FIG. 3, in order to facilitate the removal of I/O card 18 from daughter card 16, the I/O card 18 is disposed in a cassette assembly 50 that is advantageously slidably disposed on one blind swap cassette guide 52 which is operably connected to daughter card 16 and stiffener 30 via two diametrically disposed bosses 54 extending from guide 52. Each boss 54 is configured to receive a mechanical fastener 56, such a screw, for example, to be threadably engaged with stiffener 30 through card 16. Thus, when it is desired to install I/O card 18 with card 16, I/O card 18 is simply slid in a horizontal direction 58 into daughter card enclosure 60 defined by a corresponding aperture 36 and surrounding card 16 and tail stock 34 and is supported via a wall 62 extending from guide 52.

Guide 52 is preferably configured to guide cassette assembly 50 having card 18 into enclosure 60 and insure full insertion thereof before engaging a connector of card 18 with a corresponding connector 66 electrically connected to daughter card 16 and surrounded by guide 52. Two guide pins 68 extend on opposing sides of connector 66 to guide card 18 when cassette assembly 50 is fully inserted in enclosure 60.

Figure 4:
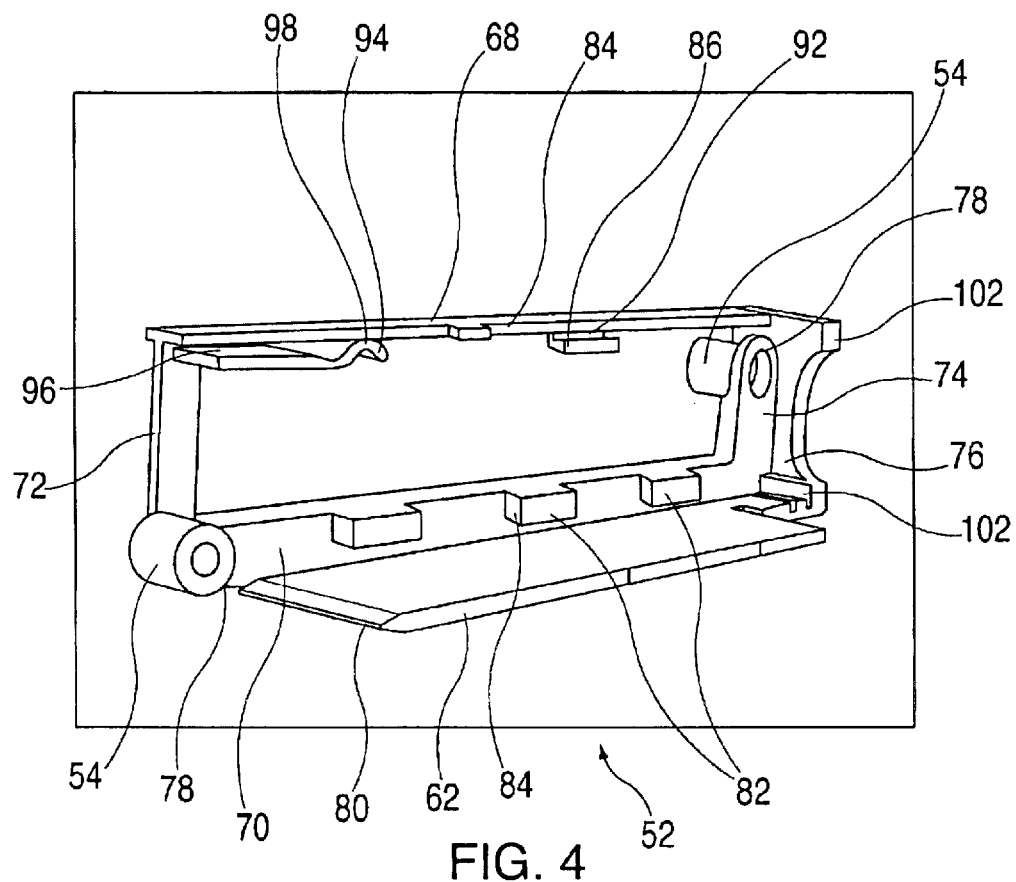
FIG. 4 is an enlarged perspective view of the exemplary embodiment of a blind swap cassette guide removed from the daughter card illustrating a tactile feedback snap system and twin catch feature incorporated therewith for receiving corresponding features configured in the I/O cassette housing.

Referring now to FIG. 4, guide 52 is shown removed from enclosure 60. Guide 52 is defined by a top rail 68 and a bottom rail 70 substantially parallel with each other and connected via a front side rail 72 and an opposite back side rail 74, each substantially parallel to each other, and substantially normal to top and bottom rails 68, 70. Front side rail 72 interfaces with bottom rail 70 at one boss 54, while the other diametrically opposed boss 54 interfaces with back side rail 72 and a back wall 76 normal to back side rail 74. Back wall 76 extends between top and bottom rails 68, 70 and provides a stop for further insertion of cassette assembly 50. Each boss 54 is preferably counter sunk as indicated generally at 78 so that a flat headed mechanical fastener 56 (e.g., flat head screw) is flush with surfaces defining back side rail 74 and bottom rail 70.

Figure 5:
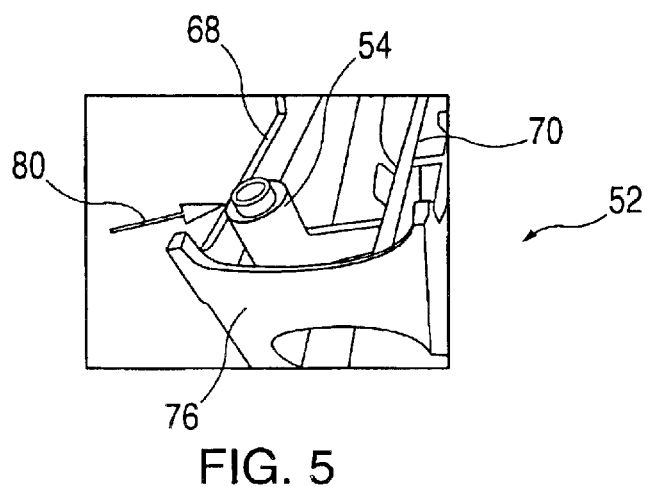
FIG. 5 is a partial bottom perspective view of FIG. 4 illustrating a locating feature of the guide.

Referring to FIG. 5, a partial bottom perspective view of back side rail 74 and corresponding boss 54 is illustrated. Each boss 54 includes a locating feature 80 extending from boss 54 configured to locate guide 52 in a complimentary configured aperture (not shown) in card 16 for proper alignment of guide 52 with respect to connector 66 extending therefrom. In an exemplary embodiment as shown, locating feature 80 is a pilot cylinder smaller in diameter than a cylinder defining boss 54, however, other configurations are contemplated suitable for the desired end purpose of properly locating guide 52 with daughter card 16 using only two locating bosses 54. It will be noted that more than two bosses 54 may be employed, but additional bosses take up more space in mounting the same and is not desired.

Referring again to FIG. 4, wall 62 extends from bottom rail 70 forming a support ledge for a bottom of cassette assembly 50. Wall 62 is a substantially planar and extends a majority of a length defining bottom rail 70. A leading or front edge 80 of wall 62 is preferably ramped to aide insertion of cassette assembly 50 into enclosure 60.

Figure 7:
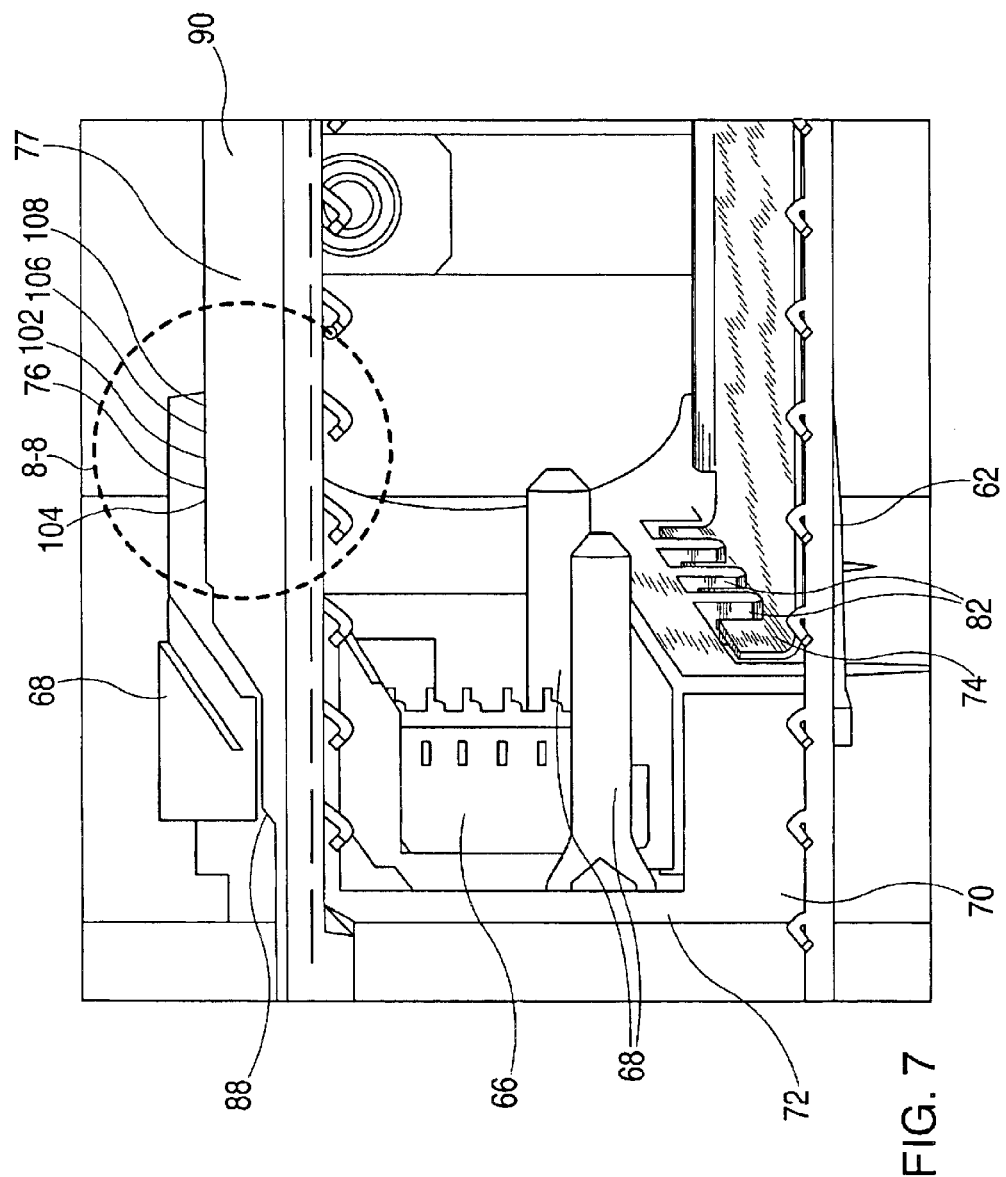
FIG. 7 is an enlarged sectional perspective view of FIG. 6 illustrating only the cassette housing engaged with the blind swap cassette guide.

Referring to FIGS. 4 and 7, bottom rail 70 also includes a plurality (three shown) catch features 82 depending therefrom to slidably engage a flange 74 extending from cassette housing 77 defining cassette assembly 50. Flange 74 extends from a bottom portion of cassette housing 77 and substantially extends a length defining a length of cassette assembly 50. Catch features 82 are preferably configured as an offset flange to slidably retain flange 74 in a bight portion 84 defined by the offset flange. In this manner, cassette assembly 50 may be slidably translated in and out of enclosure 60 along a plane defined by daughter card 16. Furthermore, catch features 82 aide is stabilizing cassette assembly 50 with respect to card 16 as well as distribute forces when plugging and unplugging connectors associated with cards 16 and 18.

Still referring to FIG. 4, top rail 68 is defined by a planar member 84 substantially parallel with wall 62. Planar member 84 includes a top rail catch feature 86 extending therefrom disposed generally at a middle portion defining a length of top rail 68. Top rail catch feature 86 is an offset flange extending from a bottom surface defining top rail 68 similar to the offset flange forming bight portion 84 in catch feature 82 extending from a side surface defining bottom rail 70. Top rail catch feature 86 is configured to engage an edge 88 defining a top housing 90 of cassette housing 77. Top rail catch feature 86 defines a groove 92 in which edge 88 is slidably retained to prevent pivotal movement of cassette assembly 50 relative to a plane defining daughter card 16.

Top rail 68 further includes a tactile feedback snap feature 94 extending therefrom configured to form a groove 96 similar to groove 92 in which edge 88 is slidably retained to prevent pivotal movement of cassette assembly 50 relative to a plane defining daughter card 16. Moreover, tactile feedback snap feature 94 is preferably configured as a snap feature 94 to indicate full insertion of cassette assembly 50 when snap feature 94 is aligned with a notched portion or a cutout 97 (FIG. 3) in edge 88 extending from a top portion of housing 77.

Figure 6:
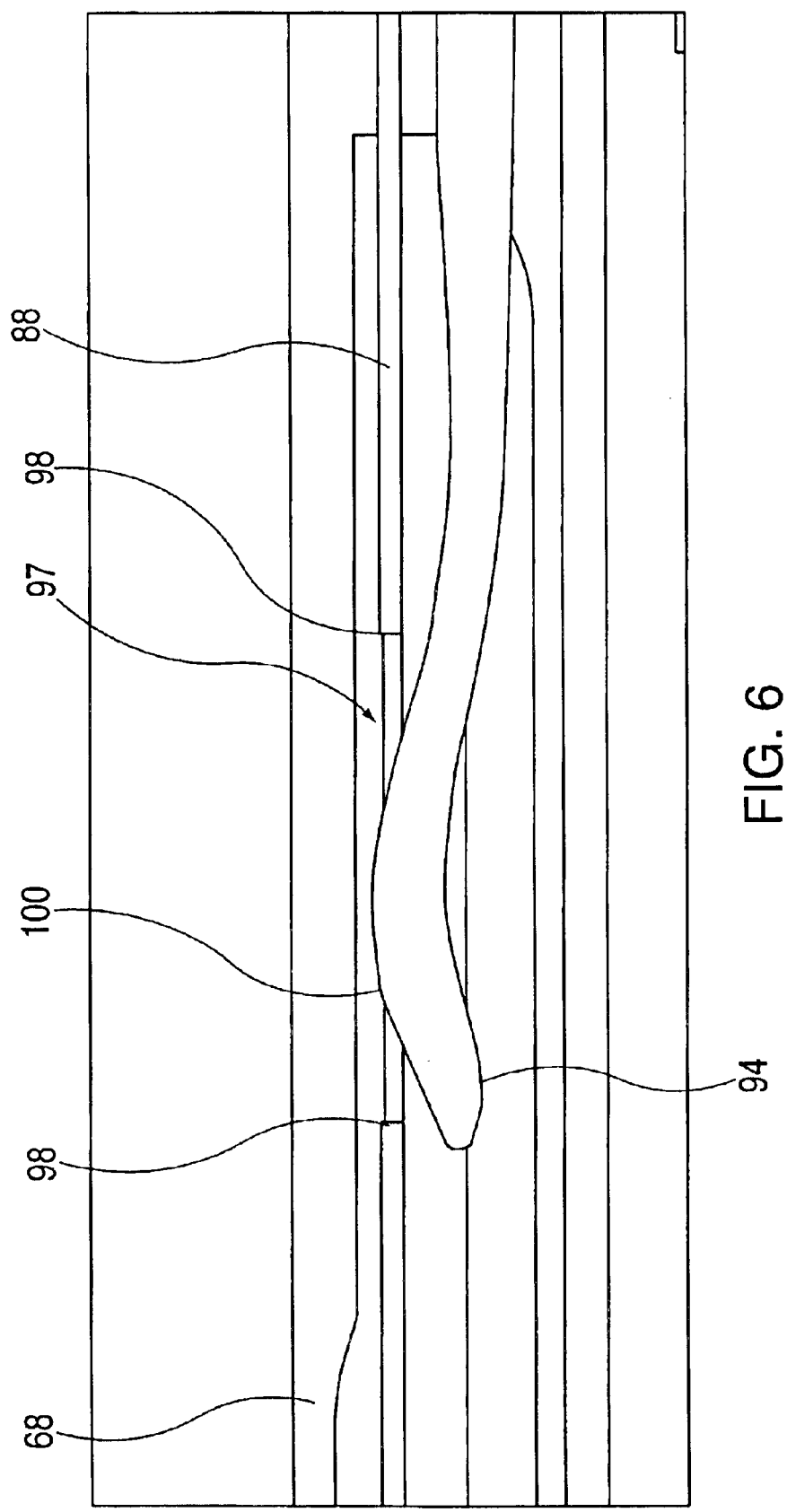
FIG. 6 is an enlarged cross section view of a tactile feedback snap system shown in FIG. 4.

More specifically referring to FIG. 6, when cutout 97 is slidably aligned with snap feature 94 upon insertion of cassette assembly 50 in a direction 58 (see FIG. 3), at least one of an audible alert and/or a snap feel is experienced when two opposing edges 98 of cutout 97 defined by edge 88 becomes engaged with a resilient snap feature head 100 extending within cutout 97, otherwise snap feature head 100 rides along a bottom surface defining member 84 defining top housing 90 until cutout 97 is aligned therewith.

Figure 8:
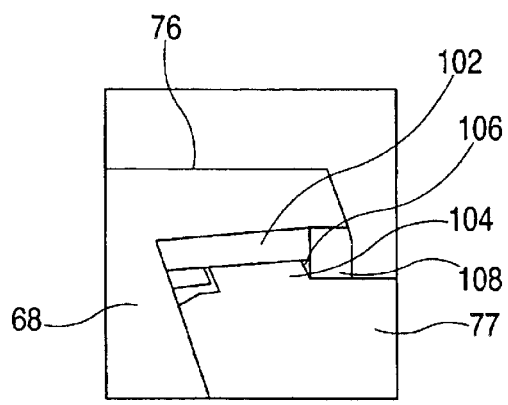
FIG. 8 is an enlarged view of circle portion 8—8 of FIG. 7 illustrating engagement of cassette housing with one of twin catch features disposed in a back wall of the guide.

Referring now to FIGS. 4, 7 and 8, guide 52 includes twin catch features 102 configured in back wall 76, each feature 102 is aligned with a corresponding top and bottom rail 68, 70 interface with back wall 76. Each catch feature 102 is configured to receive and removably retain a tab 104 extending from cassette housing 77. In this manner, each tab 104 stabilizes a back portion or insertion end of cassette housing 77 when plugging and unplugging card 18 with daughter card 16. In particular, an edge 106 defining tab 104 abuts end wall 108 defining each catch feature 102 when plugging complimentary connectors of cards 16 and 18 together.

Figure 9:
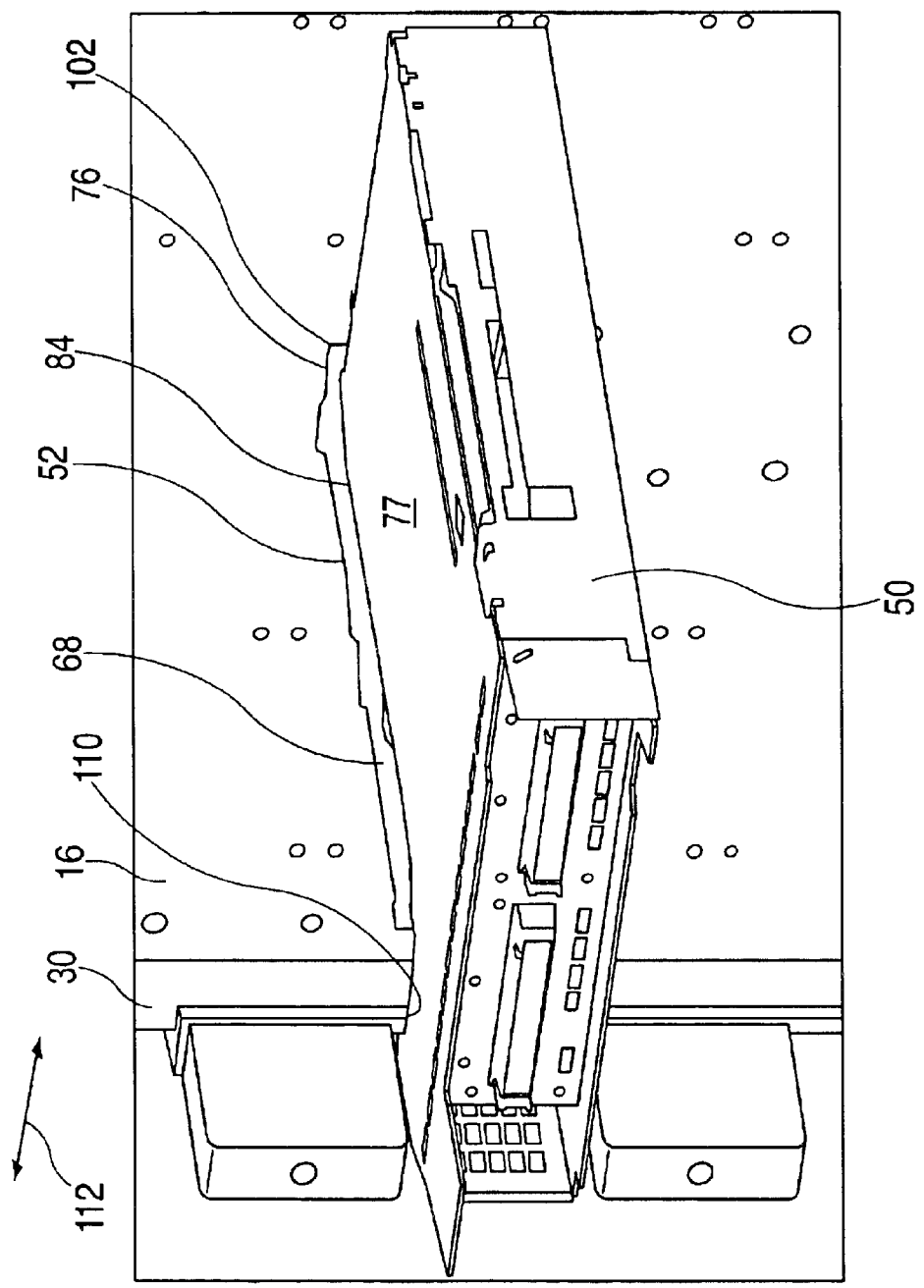
FIG. 9 is a reverse perspective view of FIGS. 1 and 2 with the tall stock removed illustrating an I/O cassette docked with the blind swap cassette guide via the twin catch features and cutout section configured in the stiffener.

Referring now to FIG. 9, cassette assembly 50 is shown fully inserted with respect to guide 52 where tabs 104 are engaged with a respective catch feature 102 to stabilize and distribute forces at an insertion end or back end of the assembly 50. A front end is stabilized via a first slot 110 configured in cassette housing 77 having a first edge defining slot 110 engage an outside surface defining stiffener 30 while an opposite second edge defining slot 110 engages an opposite edge defining stiffener 30. In this manner, when cassette assembly 50 is fully inserted via direction 58 in FIG. 3, cassette assembly 50 is stabilized from movement in a direction indicated with arrow 112. Furthermore, when a corresponding second slot 110 is configured on a bottom surface defining cassette housing 77 aligned with first slot 110 in a top portion of cassette housing 77, cassette assembly 50 is further stabilized and pivotal movement thereof is restricted about a plane defining daughter card 16.

Figure 10:
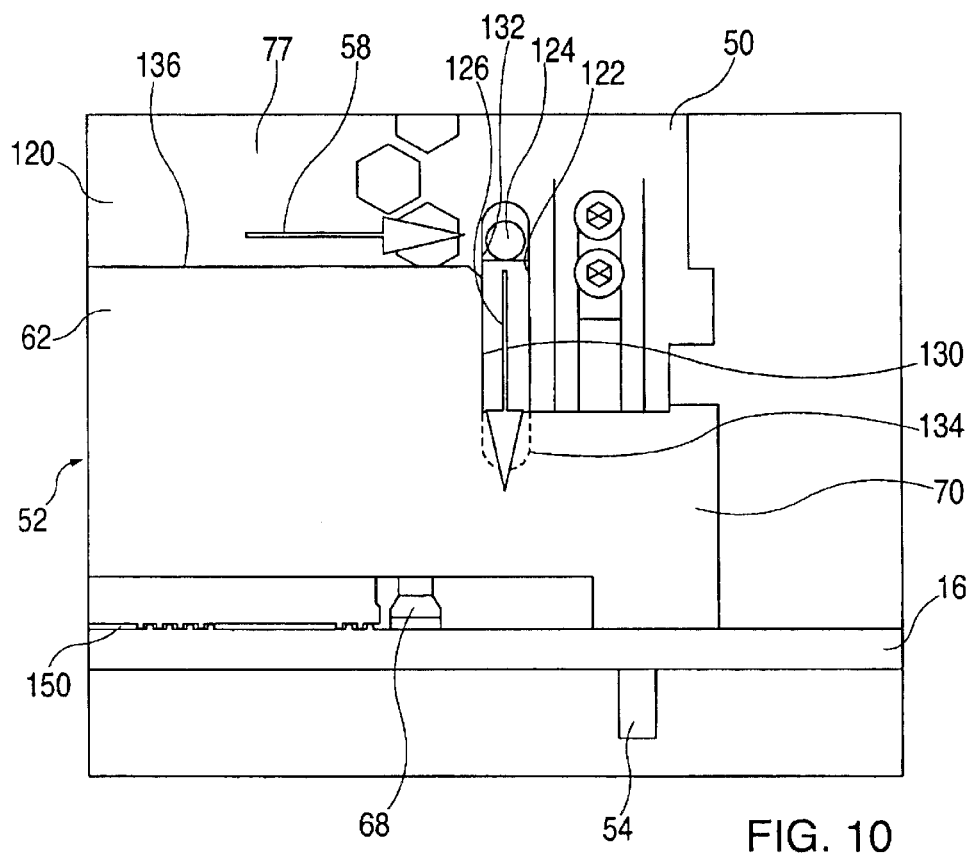
FIG. 10 is a bottom view of FIG. 6 illustrating a slot and pin feature of the cassette assembly as it cooperates with an edge defining a wall extending from the blind swap cassette guide.

Referring now to FIG. 10, a bottom view of guide 52 having cassette assembly 50 fully inserted is illustrated. Bottom portion 120 of cassette housing 77 includes a slot 122 having a pin 124 extending therethrough. Pin 124 is operably connected to I/O card 18 and translates therewith in a direction indicated at 126 and opposite thereto. Direction 126 corresponds to plugging card 18 with card 16 while an opposite direction corresponds with unplugging the same. A side edge 130 defining one edge of wall 62 opposite leading edge 80 and corresponding to a width of wall 62 extending from bottom rail 70 is aligned with one edge 132 defining slot 122 when cassette assembly 50 is fully inserted in direction 58. In this manner, pin 124, and hence card 18, is allowed to translate in direction 126 and thus allow plugging of connectors generally shown at 150 from corresponding cards 16 and 18. Guide 52 further includes a recessed region 134 in bottom rail 70 (shown in phantom) proximate side edge 130 and aligned with slot 122 in cassette housing 77 when cassette assembly 50 is fully inserted.

When cassette assembly 50 is not fully inserted in direction 58, pin 124 is aligned with an extended edge 136 defining a length of wall 62 and is prevented from being translated in direction 126, as it will be recognized by one skilled in the pertinent art, thus preventing plugging of card 18 with card 16. In this manner, misplugging between connectors 150 is eliminated when cassette assembly 50 is not fully inserted with respect to direction 58. Like wise, after cards 16 and 18 are plugged together via corresponding connectors 150, cassette assembly 50 may not be withdrawn from enclosure 60 in a direction opposite to direction 58 until card 18 is fully unplugged from card 16 via full translation of pin 124 in a direction opposite to direction 126. When card 18 is not fully unplugged with card 16, pin 124 is aligned along a length of side edge 130 and translation of cassette assembly in a direction opposite to direction 58 is restricted until pin 124 is free from side edge 130 as illustrated in FIG. 10. With this arrangement, damage to the very high density metricinterconnector (VHDM's) associated with connectors 150 for cards 16, 18, for example, is eliminated by assuring full insertion of cassette assembly 50 before plugging and full unplugging before extraction of cassette assembly 50.

Most blind swap cassette guides of this nature require more than two fasteners to implement, only work in a vertical application, and have no additional card protection features. In summary, the above described invention allows a more accurate insertion of the I/O blind swap cassette using several new and innovative techniques. First only two bosses are used as mounting points having locating features to a planar board or daughter card, thereby eliminating the need for additional holes to be drilled in the planar board or daughter card. Second, by choosing plastic as the material from which the guide is fabricated, the highest degree of accuracy and structure is achieved while minimizing cost and space consumption. Finally, the plastic guide described above works equally well in horizontal or vertical applications.

In an exemplary embodiment, the plastic guide includes a wall configured for cooperation with a slot and pin feature of the cassette assembly which prevents the I/O card from being prematurely plugged without having the cassette fully inserted (potentially damaging both the I/O card connector and planer board). In addition, the guide involves a tactile feedback snap indicating that the cassette has been fully inserted. Finally, two catch features disposed at an insertion end or back end the guide stabilize the cassette during the plugging process and distribute the connector force.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for guiding a card enclosure into a daughter card enclosure comprising:
   a daughter card removably positioned within a cage for connecting said daughter card with a mother card, said daughter card having a signal connector configured to connect to said mother card for signal interconnection therebetween;

a cassette assembly removably positioned with the daughter card enclosure for connection with said daughter card, said cassette assembly having a card configured for pluggable signal interconnection with said daughter card; and a guide means for guiding said cassette assembly into proper alignment with said daughter card for said pluggable signal interconnection therewith, said guide means mountable to said daughter card and an associated stiffener using two mounting locations, said guide means configured to insure full insertion of said cassette assembly before plugging in said card and insure an unplugged status of said card before extraction of the cassette assembly from said daughter card enclosure.

2. The apparatus of claim 1, wherein said guide means includes a tactile feedback feature indicative that said cassette assembly is fully inserted before plugging in said card.

3. The apparatus of claim 1, wherein said guide means includes two catch features configured to releasably retain an insertion end of said cassette assembly, said two catch features configured to at least one of stabilize said cassette assembly and distribute a connector force associated with a plugging process with respect to the daughter card.

4. The apparatus of claim 3, wherein said guide means includes additional catch features configured to slidably engage a flange defining a length of said cassette assembly, said flange extending from a bottom surface defining said cassette assembly, said additional catch features substantially allowing movement of cassette assembly only in a plane defining said daughter card.

5. The apparatus of claim 1, wherein said guide means is configured to guide and dock said cassette assembly in horizontal and vertical applications.

6. A multiple card enclosure comprising:

a mother card cage having a mother card enclosed therein;

a daughter card removably positioned within said cage for connecting said daughter card with the mother card, said daughter card having a signal connector configured to connect to said mother card for signal interconnection therebetween;

a cassette assembly removably positioned with a daughter card enclosure for connection with said daughter card, said cassette assembly having a card configured for pluggable signal interconnection with said daughter card; and a guide assembly configured to guide said cassette assembly into proper alignment with said daughter card for said pluggable signal interconnection therewith, said guide assembly mountable to said daughter card and an associated stiffener using two mounting bosses extending from said guide assembly, said guide assembly configured to insure full insertion of said cassette assembly before plugging in said card and insure unplugging of said card before extraction of the cassette assembly from said daughter card enclosure.

7. The enclosure of claim 6, wherein said guide assembly includes a tactile feedback feature configured to at least one of indicate full insertion of said cassette assembly before plugging in said card and insure proper connector alignment between said card and said daughter card.

8. The enclosure of claim 7, wherein said tactile feedback feature includes a resilient snap feature on said guide assembly configured to engage a slot defined by a housing flange extending from said cassette assembly when said cassette assembly is fully inserted with respect to said daughter card enclosure.

9. The enclosure of claim 6, wherein said guide assembly includes two catch features configured to releasably retain an insertion end of said cassette assembly, said two catch features configured to at least one of stabilize said cassette assembly and distribute a connector force associated with a plugging process with respect to the daughter card.

10. The enclosure of claim 9, wherein each catch feature is disposed on said guide assembly so as to engage a corresponding complementary configured feature extending from said cassette assembly at a lower corner defining the insertion side of the cassette assembly.

11. The enclosure of claim 10, wherein said cassette assembly includes another slot configured in said housing flange defined by a first edge engaging an outside surface of said stiffener and an opposite second edge engaging a surface of said daughter board, said another slot is configured to at least one of stabilize said cassette assembly and distribute a connector force associated with a plugging process with respect to the daughter card.

12. The enclosure of claim 11, where in said guide assembly includes additional catch features configured to slidably engage a flange defining a length of said cassette assembly, said flange extending from a bottom surface defining said cassette assembly, said additional catch features substantially allowing movement of cassette assembly only in a direction corresponding with insertion and extraction of said cassette assembly.

13. The enclosure of claim 12, wherein said guide assembly is defined by a top rail and a bottom rail parallel to said top rail and defining a length of said guide assembly, said additional catch features are intermittently disposed on said bottom rail while said top rail includes a guide flange extending from a middle portion thereof, said guide flange configured to engage an edge defining said housing flange to allow translation therealong but limit rotation.

14. The enclosure of claim 6, wherein said guide assembly is configured to guide and dock said cassette assembly in horizontal and vertical applications.

15. The enclosure of claim 6, wherein said guide assembly configured to insure full insertion of said cassette assembly before plugging in said card and insure unplugging of said card before extraction of the cassette assembly from said daughter card enclosure includes a wall extending from a base defining said guide assembly, said wall providing support to said cassette assembly upon insertion and extraction of said cassette assembly in said daughter card enclosure, said wall dimensioned to align a pin and slot feature configured in said cassette assembly to insure proper installation and extraction of said card within said cassette assembly, said pin translatable with said card.

16. The enclosure of claim 14, wherein said base of said guide assembly includes a recessed slot proximate a side edge defining said wall, said recessed slot configured to receive said pin when said cassette assembly is fully inserted with respect to said daughter card enclosure and said pin is allowed to translate along said side edge toward said recessed slot in said base.

17. The enclosure of claim 16, wherein said side edge is defined by a length sufficient to prevent extraction of said cassette assembly when said card is not fully unplugged.

18. The enclosure of claim 16, wherein said wall includes a second side edge opposite said first side edge defining said wall, said second side edge is ramped to facilitate insertion and alignment of said cassette assembly.

19. The enclosure of claim 18, wherein a outside edge intermediate said first and second edges defines said wall, said outside edge is configured to at least one of prevent misplugging of said card when said pin is aligned along a length defining said outside edge.

20. The enclosure of claim 6, wherein each of said two mounting bosses extending from said guide assembly includes a locating feature configured to properly locate said guide assembly with a complementary configured aperture in at least said daughter card for properly mounting said guide assembly thereto.

21. The enclosure of claim 6, wherein said each of said two mounting bosses includes a cylinder having a smaller diameter cylinder locating feature both defined by a pilot hole to accept a screw therethrough for mounting to at least one of said daughter card and said stiffener, said pilot hole being countersunk at an end defined by the larger diameter cylinder.

22. A central electronics complex of a computer system, comprising:

a cage configured to be received in a rack;

a backplane disposed in said cage, said backplane including a mother card having at least one card slot on a surface thereof;

a plurality of daughter cards removably positioned within said cage, each daughter card having a signal connector configured to connect with a corresponding card slot in said mother card for signal interconnection therebetween;

a cassette assembly removably positioned with a daughter card enclosure for connection with said each daughter card, said cassette assembly having a card configured for pluggable signal interconnection with said each daughter card; and a guide assembly configured to guide said cassette assembly into proper alignment with said each daughter card for said pluggable signal interconnection therewith, said guide assembly mountable to said each daughter card and an associated stiffener using two mounting bosses extending from said guide assembly, said guide assembly configured to insure full insertion of said cassette assembly before plugging in said card and insure unplugging of said card before extraction of the cassette assembly from said daughter card enclosure.

\* \* \* \* \*